2 Sheets—Sheet 1.
W. TEAMER.
Corn-Drill.
No. 215,410. Patented May 13, 1879.
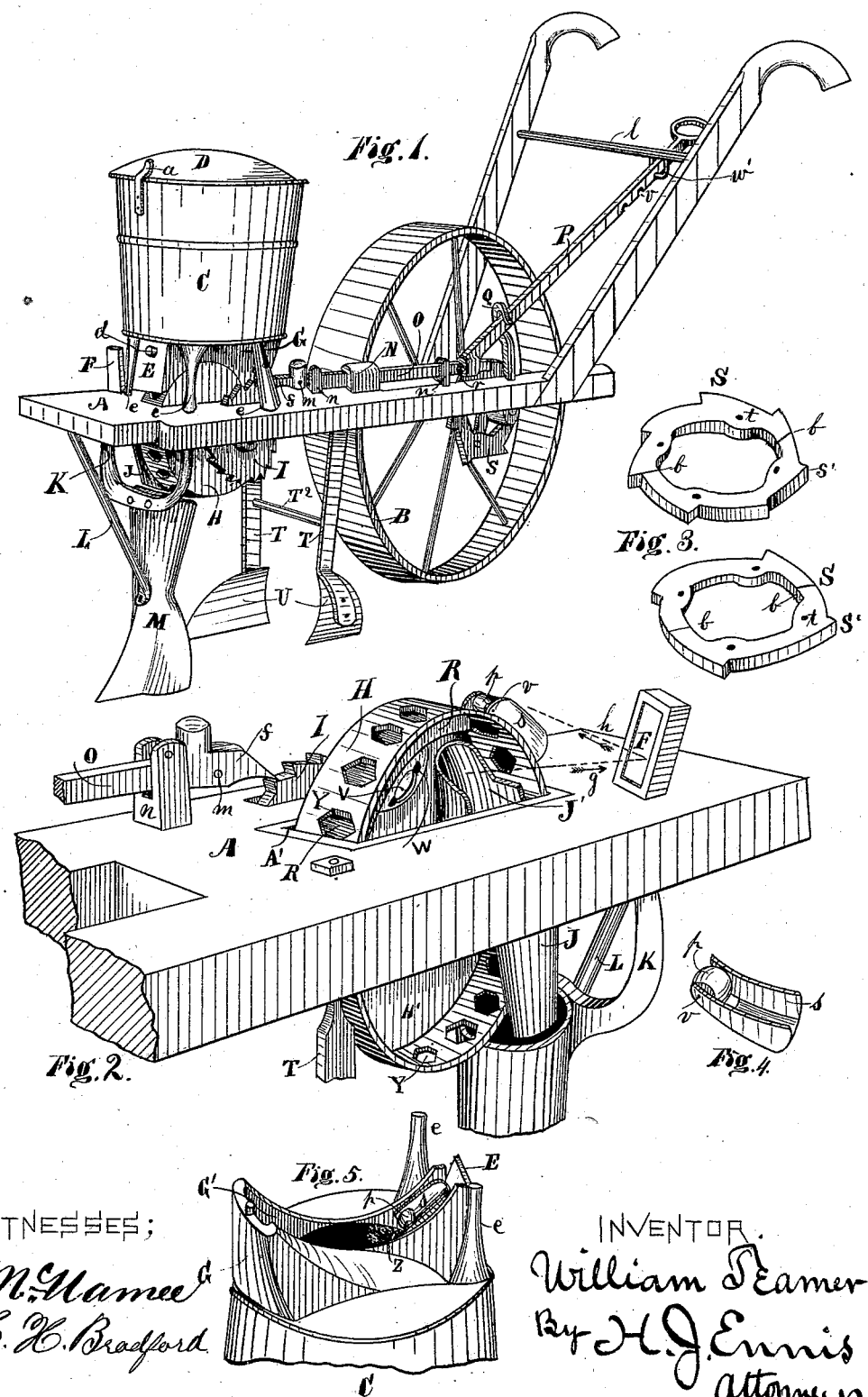

2 Sheets—Sheet 2.
W. TEAMER.
Corn-Drill.
No. 215,410. Patented May 13, 1879.
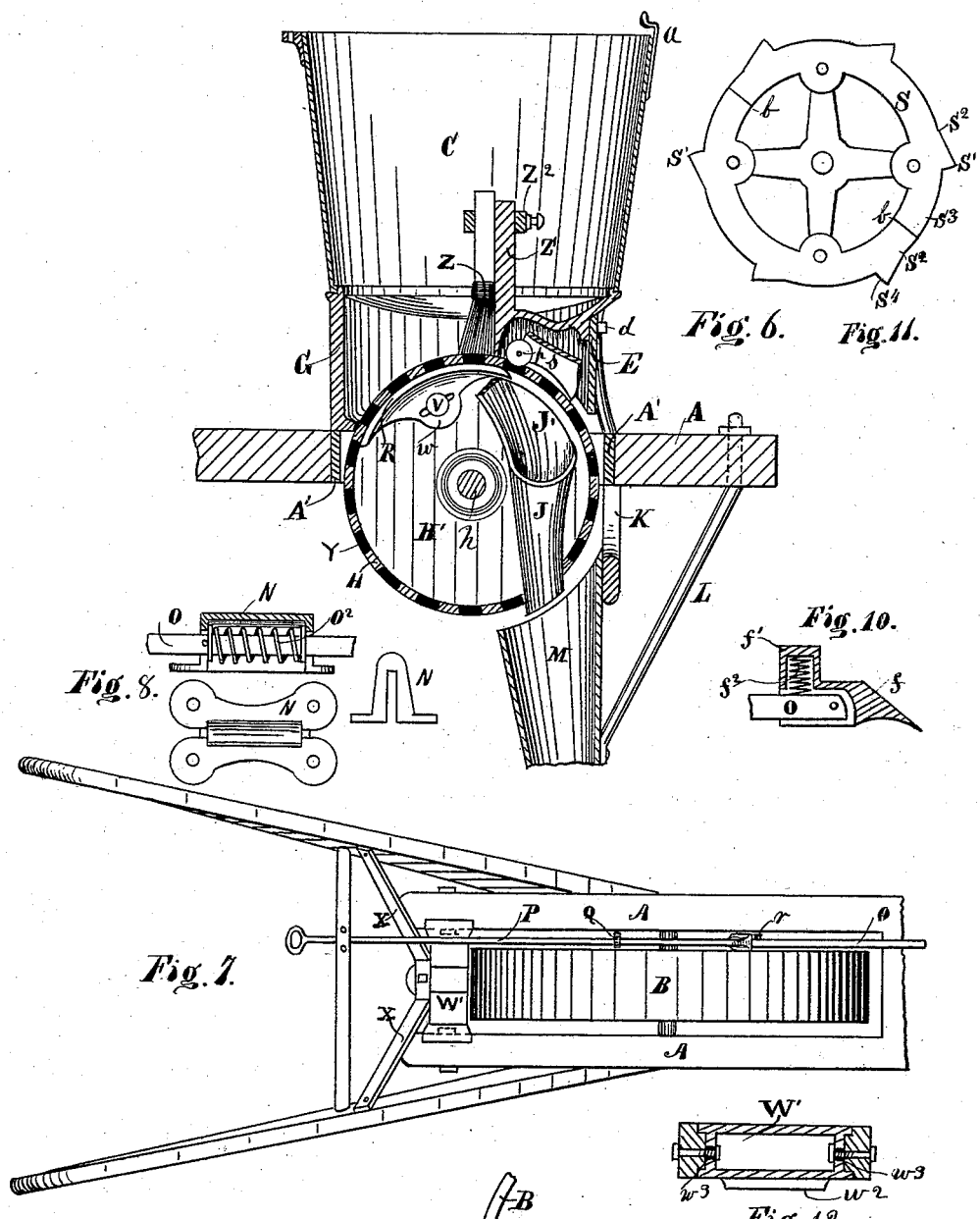
WITNESSES;
J. McNamee
E. H. Bradford
INVENTOR.
William Teamer
By H. J. Ennis
Attorney.

UNITED STATES PATENT OFFICE.

WILLIAM TEAMER, OF EVANSVILLE, INDIANA.

IMPROVEMENT IN CORN-DRILLS.

Specification forming part of Letters Patent No. 215,410, dated May 13, 1879; application filed January 17, 1878.

*To all whom it may concern:*

Be it known that I, WILLIAM TEAMER, of the city of Evansville, county of Vanderburg, and State of Indiana, have invented certain new and useful Improvements in Corn-Drills; and I do hereby declare the following to be a full, clear, and exact description of the same, reference being made to the accompanying drawings, forming a part of this specification, and in which—

Figure 1 represents a perspective view of my improved machine. Fig. 2 is a side view of the same with the hopper and its appurtenances removed. Figs. 3, 4, and 5 are detail views. Fig. 6 is a vertical section through the front portion of the machine. Fig. 7 is a top or plan view of the rear portion of the machine. Figs. 8, 9, 10, 11, and 12 are detail views.

The object of my invention is to provide a machine for planting corn in which accuracy in any desired distance between each hill of corn planted is secured, certainty in depositing the seed at every attempt of the drill to deposit it, an efficient means of covering the seed after it has been deposited in the ground, a means of ascertaining at any time, without stopping the machine, whether the drill is properly doing its work, and, finally, to provide a drill which shall be simple in its construction, effective in operation, and not easily got out of order; and to this end the invention consists in the general construction, combination, and arrangement of parts by which the above-described results are obtained, all as will be hereinafter fully described, and specifically pointed out in the claims.

In the drawings, A represents the frame of my improved drill, to the rear and under side of which is journaled the shaft of the ground or covering wheel B.

C represents the hopper, supported above the frame A by standards connected thereto, and D represents a circular swinging or pivoted cover therefor.

G represents the bottom of the hopper, which is provided with a longitudinal semicircular recess, by which said bottom is adapted to fit closely over the top of a revolving drum, H, projecting up through a slot, G', in said bottom. The upper portion of said bottom is provided with a flaring recess increasing in depth toward the rear portion thereof, through which the drum H projects, so that the greatest pressure of the mass of corn in the hopper is kept directly over the portion of the drum projecting into said hopper, so that as the drum revolves the hexagonal holes Y, punched through said drum around its periphery, cannot well pass without a kernel or grain of corn being withdrawn or deposited therein, the hexagonal holes being of such a size as to permit of but one grain of corn passing through them at a time, and the hexagonal shape of the holes being especially adapted for withdrawing or retaining from the mass of corn a single seed.

The drum H is made hollow and open at one end, and the shaft for revolving said drum passing through the closed end H' thereof and journaled to the under side of the frame A.

R represents a segmental curved guard fitting against the upper interior surface of the drum and directly under the portion extending up through the hopper-bottom, the rear portion of said guard extending just over the front portion of the mouth of the receiving-tube J'. By means of this guard the seeds deposited or withdrawn into the holes of the drum while passing through the hopper-bottom are retained therein until they pass around beyond the end of the guard, when they will fall through said holes into the mouth of the receiving-tube J'.

P represents a small revolving wheel journaled in a frame, s, which is fitted under the forward end of the semicircular recessed bottom G of the hopper, said roller being pressed against the outer periphery of the drum by a spring, E, so that as the drum revolves the roller will roll over the holes therein and force any seed that may stick in the holes through them.

Z represents the ordinary brush arranged in the hopper, and which is secured to a projecting vertical standard, Z', by a clamping ring or clasp and set-screw, Z².

The receiving-tube J' is arranged inside of the drum H, its lower end communicating with the discharge-tube J, which in turn communicates with the upper end of the hollow furrow-opener or plow M. The guard R is provided with a right-angled portion, w, having a slot through the same, and through which the set screw v passes, and by which said guard is adjustably secured to a right-angled plate (not shown in the drawings) connected to the vertical rectangular metallic frame A'. The upper end of the receiving-tube J' is made open at one side, and upon the frame of the drill, a little to one side and in front of the drum H, is arranged a looking-glass, F, which is so arranged as to obliquely face the open end of the drum and receiving-tube, so that the dropping of the seed into the receiving-tube is reflected across the face of the glass, so as to be plainly seen by the driver or operator having hold of the handles of the drill, thus at all times permitting the driver or operator to see whether the drill is properly doing its work without having to stop the machine.

The hollow furrow-opener or plow M is connected by the transverse U-shaped brace K and front diagonal brace, L, to the front portion of the frame of the drill, thus rendering said furrow-opener or plow rigid without being directly attached to the frame, and permits a disconnection from the discharge-tube J, so that in case the opener or plow should be broken or wrenched from its position by meeting obstructions the other parts of the drill will not thereby be injured.

U U represent two coverers or ridgers, with their front points turned outward in opposite directions, and made concave on their inner or facing sides, in the form of semicircular tubes, for forming or making a ridge over the dropped corn. The standards T of said coverers are rigidly secured to the frame A, and rigidly connected together by a cross-rod, $T^2$.

I represents a ratchet-wheel mounted on the revolving shaft of the drum H, and with which a pawl, f, affixed to one end of the rod O, engages, said pawl being provided with a housing, $f^1$, for the reception of a spring, $f^2$, resting on the rod O, as clearly shown in Fig. 10. The rod O passes through a case, N, and is encircled by a retracting-spring, $O^2$, in said case, for a purpose hereinafter described. The rod also extends backward toward the rear of the drill through guides n, and its rear end engages with the teeth of a distance-wheel, S, mounted on the shaft of the ground-wheel B, so that as said distance-wheel is revolved it forces the rod forward, which, through the medium of the pawl f on its other end engaging with the ratchet-wheel on the shaft of the drum, revolves said drum, and thus the seed is fed to the hollow opener or plow M in the manner above described.

The teeth $S^4$ of the distance-wheel are made rounding, and the back of the teeth from $S^1$ to $S^2$ cut away abruptly, as shown in Fig. 11, so as to partly relieve friction on the lower angle of the rod O when it engages with the teeth of the wheel.

Interchangeable or different sets of distance-wheels are provided for each drill, said wheels being of the same size, but provided with different number of teeth for the purpose of regulating or dropping corn at different distances apart, the distance-wheels with less teeth dropping the corn at a wider distance between hills than those wheels having more teeth.

P represents a rod provided with a handle on its upper end and a series of notches, v, which engage with a catch, w', secured to the cross-rod l of the handles of the drill. The lower end of the rod P is provided with a bifurcated catch bestriding the rod O, and engaging with a stop, r, on said rod. The rod P is for the purpose of disengaging the rod O from the teeth of the distance-wheel, whereby the seeding mechanism is thrown out of gear with the operating mechanism, and which is accomplished by the driver or operator pushing the rod P forward, which forces the rod O forward out of contact with the teeth of the distance-wheel, in which position it is retained by the notched rod P engaging with the catch w', as clearly shown in Fig. 1, thus stopping the seeding mechanism without stopping the machine.

$W^1$ represents an iron brace provided with grooves, in which the tenons of the rear ends of the side bars of frame A fit, said brace being arranged between the ends of the wooden frame, and bolted thereto, as shown in Fig. 12, thus not only bracing said frame, but constituting at the same time a scraper, $W^2$, for the ground-wheel.

The operation of my improved machine is as follows: The hopper being filled with the seed-corn, and the drill drawn over the ground, the wheel B will be revolved, which will revolve the distance-wheel mounted on the shaft of the wheel B, the teeth of which will engage with the rear end of the rod O, pressing it forward, and thus revolving the drum H through the medium of the pawl and ratchet-wheel f I, thus carrying the drum H forward at each movement of the ratchet-wheel, so as to project one of the hexagonal holes therein beyond the rear end of the guard R, and the grain of corn drops downward through the tubes J' J and furrow-opener or plow M into the furrow, and is covered by the coverers or ridgers U. If the grain of corn should be inclined to stick in the hole of the drum, it will be promptly pushed through by the roller p, which from its position runs over the holes in the drum. Instantly upon the rod O being released or disengaged from a passing tooth on the distance-wheel it will be retracted back to its original position by the spring $O^2$, and thus ready to continue or repeat the above-described operation.

I am aware that a grain-drill having a horizontal reciprocating slide provided with a series of hexagonal seed-openings through the same, and also a corn-drill having a drum provided with a series of openings through its periphery, with shields or guards for retaining the seed in said openings until they reach the conductor-spouts, are old, and such I do not desire to be understood as claiming, broadly, as my invention; but,

Having thus fully described my invention, what I do claim as new, and desire to secure by Letters Patent, is—

1. In a corn-drill, the combination, with the revolving perforated drum H, of the semicircular recessed bottom G and roller $p$, arranged over said drum and under said bottom, substantially as and for the purpose herein shown and described.

2. The combination, with the hollow furrow-opener or plow M and the frame A, of the transverse pendent U-shaped brace K and diagonal brace L, whereby said opener or plow is rigidly suspended in position below the frame, but not directly connected thereto, and disconnected from the discharge-tube, substantially as and for the purpose herein shown and described.

3. The distance-wheel S, with the catching-side $S^4$ of its teeth made rounding, and the backs of the teeth cut away abruptly toward the center of the wheel, so as to relieve the friction on the lower angle of the end of the rod O when it engages with the teeth, substantially as specified.

4. The combination of a toothed distance-wheel, S, with the rod O, the case N, with its spring $O^2$, the pawl $f$, and ratchet-wheel I, substantially as and for the purpose herein shown and described.

5. The rod P, having the notches $v$, which engage with the catch $w'$, and a bifurcated catch engaging with a stop, $r$, on the rod O, whereby said rod is adapted to be forced forward to disconnect it from the teeth of the distance-wheel, substantially as and for the purpose herein shown and described.

6. The combination of the distance-wheel S, the rod O, ratchet-wheel and pawl I $f$, the revolving drum provided with the hexagonal holes, whereby at each engagement of the teeth of the distance-wheel with the rod O a single grain of corn shall be carried forward by the drum and deposited in the receiving-tube, substantially as specified.

In testimony whereof I have signed my name to this specification in the presence of two subscribing witnesses.

WILLIAM TEAMER.

Witnesses:
 WILLIAM VOELKER,
 LOUIS FRICKE.